UNITED STATES PATENT OFFICE.

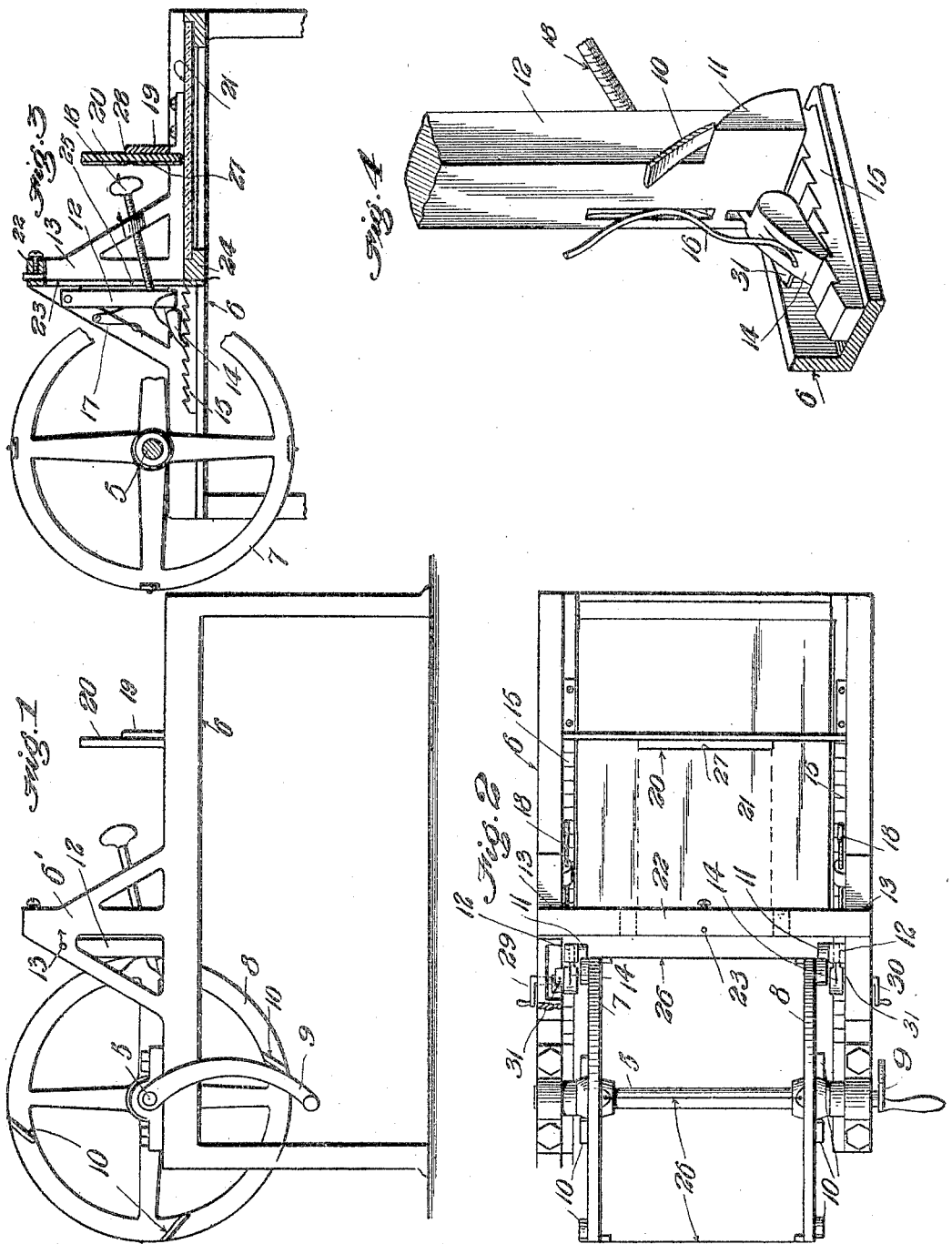

NICK W. KLINE, OF LONGBEACH, CALIFORNIA.

BUTTER-CUTTING MACHINE.

No. 797,737. Specification of Letters Patent. Patented Aug. 22, 1905.

Application filed April 3, 1905. Serial No. 253,650.

*To all whom it may concern:*

Be it known that I, NICK W. KLINE, a citizen of the United States, residing at Longbeach, in the county of Los Angeles and State of California, have invented new and useful Improvements in Butter-Cutting Machines, of which the following is a specification.

My invention relates to a machine for cutting rolls of butter into small pieces for table use; and the object thereof is to provide a machine of very rapid operation for that purpose in which the thickness and size of the pieces can be easily regulated.

I accomplish these objects by the machine described herein and illustrated in the accompanying drawings, in which—

Figure 1 is a side elevation of my machine. Fig. 2 is a plan of the same. Fig. 3 is a longitudinal central section. Fig. 4 is a detail view of a portion of the parts of the machine by which the travel of the butter through the machine is effected.

In the drawings a revoluble shaft 5 is mounted in the frame 6. Adjacent to the ends of this shaft are spiders 7 and 8, which are rigidly mounted on said shaft. A crank 9 provides means whereby the shaft and spiders may be rotated. On the outer side of each spider-rim are a plurality of shifting and advancing lugs 10, which are adapted to engage triangular-shaped lugs 11, secured upon the outer side of advancing-levers 12, which levers are pivoted to uprights 13 of the frame, there being one of these levers at each side of the machine. These advancing-levers carry dogs 14, which are normally held in engagement with rack-bars 15 by springs 16. Spring 17 keeps these shifting levers springpressed against the regulating-screw 18, which regulates the throw of the advancing-levers.

The rack-bars are united by a cross-bar 19, to which is secured the backboard 20. Between the tops of the rack-bars and resting upon the cross-timbers of the frame is a supporting-plate 21, which is preferably of glass, upon which the butter to be cut is placed. The uprights are united at the top by a crossbar 22, in which is mounted a vertical cutter 23, which is preferably made of wire, the other end of which is secured in a cross-timber 24 of the frame. There may be more of these vertical wires, if desired; but I have found in practice that one of such wires is sufficient to divide a standard roll of butter vertically.

A horizontal cutting-wire 25 is secured to the uprights. Of these horizontal wires there may likewise be more than one; but for cutting a standard-size roll of butter I have found one to be sufficient. The spiders carry horizontal cutting-wires 26, of which there may be any desired number. In practice I have found that four of these wires, with spiders eight inches across, produce satisfactory results.

In the operation of my machine the racks and backboards are placed so that the first tooth of the rack is engaged by the dog of the advancing-lever, and the roll of butter to be cut is placed on the supporting-plate with the end thereof resting against the backboard. The spiders are then rotated, and as the shifting lugs of the spiders engage the lugs on the advancing-levers the lower ends thereof are caused to travel forward, thereby advancing the roll of butter the distance of the throw of the advancing-lever, which throw is regulated by screws 18 to cause the rack to advance the required distance to give the pieces of butter when cut the required thickness.

It will be observed that the cutter-wires carried by the spiders are adjacent to the shifting lugs and a little forward of the same, so that the movement of the rack-bars will be accomplished before the following cutter-wire can reach the butter, which is pushed forward by the backboard as the rack-bar is moved forward, and that the next cutter-wire is forced through the projecting end of the roll of butter while the rack is not moving, and that it is advanced by the next shifting lug the required distance for the thickness of the next piece of butter. The pieces of butter as they are cut off are permitted to drop into the receptacle to receive the same, (not shown,) which is preferably provided with a suitable quantity of water. After the roll of butter has been all cut the last movement of the advancing-lever brings the backboard so that the notches 27 and 28 register with said wires, with the face of the board projecting, so that the revolving cutter-wires will remove the last particle of butter from the backboard if it should happen to stick thereto. Cranks 29 and 30 are then turned to bring the inner ends thereof to engage lugs 31 on the side of the dog, and thereby disengage the dogs from the rack, when it may be pushed to the back part of the machine and a new roll of butter inserted and cut off, as before described. If desired, the inner arms of these cranks could be connected together and both dogs operated from one side of the machine.

Having described my invention, what I claim as new, and desire to secure by Letters Patent, is—

1. A butter-machine comprising a frame; revoluble spiders mounted in said frame; advancing lugs secured to said spider; rack-bars slidably mounted in said frame; butter-advancing means secured to said rack-bars; advancing-levers pivotally mounted in said frame; dogs secured to the lower end of said advancing-levers said dogs being adapted to engage said rack-bars and advance the same in the direction of the spiders and to slip over said rack-bars on their backward movement.

2. A butter-machine comprising a frame; revoluble spiders mounted in said frame; cutter-wires secured to said spiders; advancing lugs secured to said spiders; rack-bars slidably mounted in said frame; butter-advancing means secured to said rack-bars; advancing-levers pivotally mounted in said frame; dogs secured to the lower ends of said advancing-levers, said dogs being adapted to engage said rack-bars and advance the same in the direction of the spiders on their forward movement and to slip over said rack-bars on their backward movement; and stationary horizontal cutting-wires mounted in said frame in close proximity to the path of travel of said cutting-wires on the spider.

3. A butter-machine comprising a frame; revoluble spiders mounted in said frame; cutter-wires secured to said spiders, said cutter-wires extending transversely the machine; advancing lugs secured on the outer edges of said spiders; rack-bars slidably mounted in said frame; butter-advancing means secured to said rack-bars; advancing-levers pivotally mounted in said frame; dogs secured to the lower end of said advancing-levers, said dog being adapted to engage said rack-bars and advance the same in the direction of the spiders on their forward movement and to slip over said rack-bars on their backward movement; and stationary horizontal and stationary vertical cutting-wires mounted in said frame in close proximity to the path of travel of said cutting-wires on the spider.

4. In a butter-cutting machine, rack-bars; advancing-levers pivotally secured to the frame of the machine; dogs carried by said levers to engage said rack-bars; and mechanism to advance said advancing-levers and to retract the same step by step; and horizontal cutters to cut off the advanced butter at each successive step of the rack-bar.

In witness that I claim the foregoing I have hereunto subscribed my name this 27th day of March, 1905.

NICK W. KLINE.

Witnesses:
G. E. HARPHAM,
EDMUND A. STRAUSE.